United States Patent [19]
Gershenson

[11] Patent Number: 5,417,855
[45] Date of Patent: May 23, 1995

[54] FILTER BAG SUBASSEMBLY

[75] Inventor: Moshe Gershenson, Mohegan Lake, N.Y.

[73] Assignee: ISP Investments Inc., Wilmington, Del.

[21] Appl. No.: 197,621

[22] Filed: Feb. 15, 1994

[51] Int. Cl.6 .................. B01D 29/11; B01D 29/27
[52] U.S. Cl. .................. 210/315; 55/334; 55/341.2; 55/341.6; 55/380; 55/381; 55/522; 55/527; 55/DIG. 26; 210/232; 210/317; 210/441; 210/446; 210/448; 210/451; 210/452; 210/453; 210/477; 210/483
[58] Field of Search .............. 210/232, 315, 317, 441, 210/442, 445, 446, 448, 451, 452, 453, 470, 477, 483, 495; 55/334, 341.2, 341.3, 341.6, 380, 381, 382, 527, 522, DIG. 26

[56] References Cited

U.S. PATENT DOCUMENTS

| | | | |
|---|---|---|---|
| 3,627,497 | 12/1971 | Klein et al. | 55/380 |
| 4,877,526 | 10/1989 | Johnson et al. | 210/448 |
| 4,986,912 | 1/1991 | Fisch | 55/381 |
| 5,075,004 | 12/1991 | Gershenson et al. | 210/445 |
| 5,137,632 | 8/1992 | Morgan, Jr. | 210/445 |
| 5,156,661 | 10/1992 | Adiletta | 55/381 |
| 5,192,424 | 3/1993 | Beyne et al. | 210/452 |
| 5,205,938 | 4/1993 | Fiumano et al. | 210/453 |

*Primary Examiner*—John Kim
*Attorney, Agent, or Firm*—Richard T. Laughlin; Joshua J. Ward

[57] ABSTRACT

A filter apparatus having a filter bag subassembly for collecting contaminating material. The filter bag subassembly includes five diametrically and axially-spaced bags and an integral collar. The five spaced bags form five spaced chambers and the integral collar has a stepped shape forming five cylinder support portions for the five spaced bags.

10 Claims, 3 Drawing Sheets

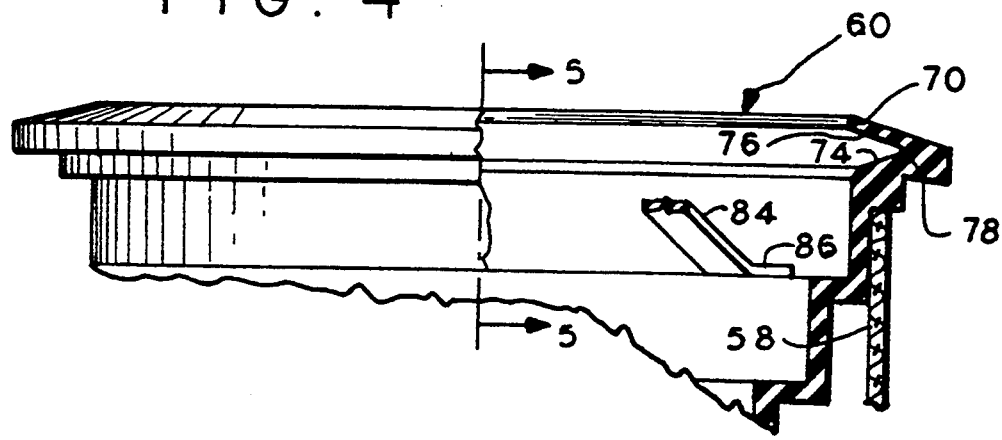
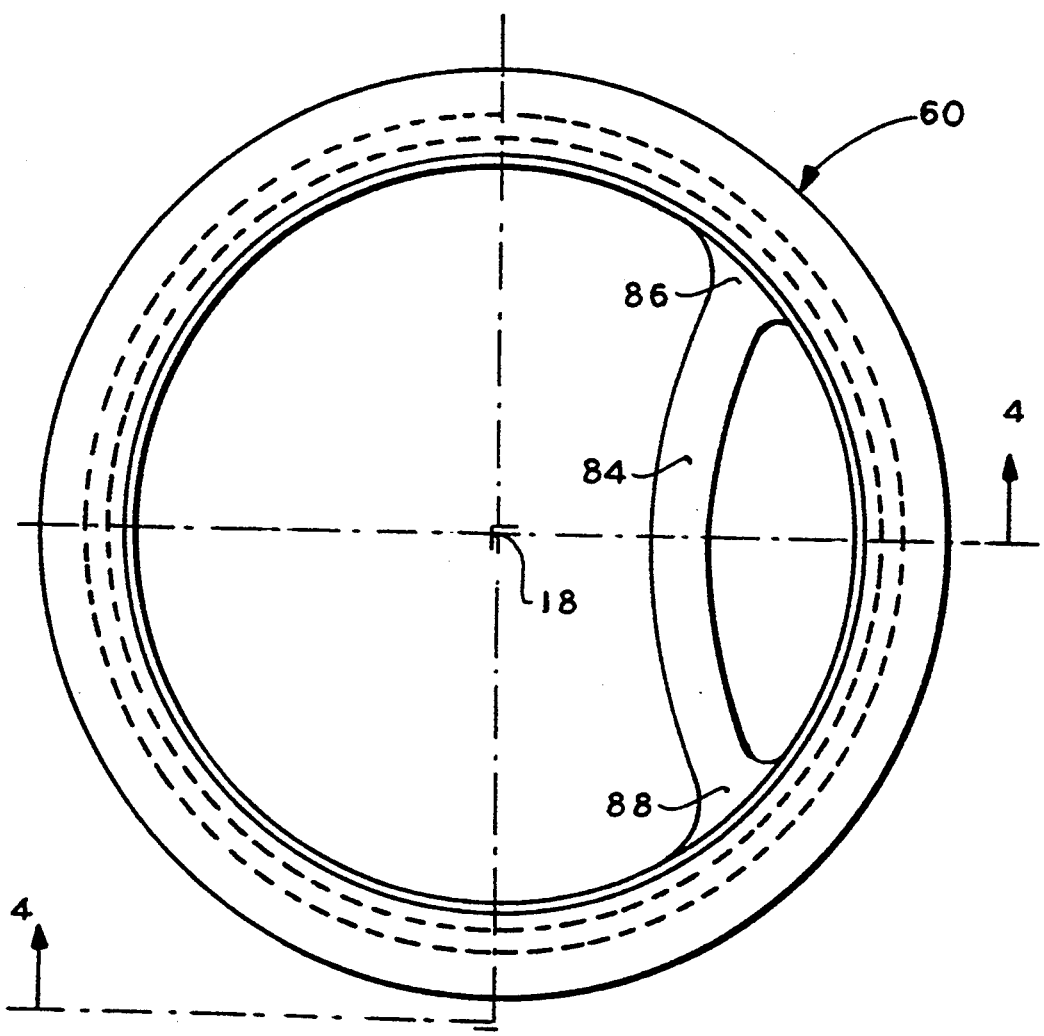

FILTER BAG SUBASSEMBLY

This invention relates to a filter bag subassembly unit and, in particular, the invention relates to a filter bag subassembly having a resilient, stepped collar and having radially-spaced concentric bags which provide increased operating efficiency.

BACKGROUND OF THE INVENTION

The prior art filter apparatus, which has a bag unit and a resilient gasket, is described in U.S. Pat. No. 5,075,004, issued Dec. 24, 1991. A related application is U.S. application Ser. No. 08/112,727, filed Aug. 27, 1993. Related patents include U.S. Pat. Nos.:

3,771,664, issued Nov. 13, 1973,
4,133,769, issued Jan. 9, 1979,
4,204,966, issued May 27, 1980,
4,259,188, issued Mar. 31, 1981,
4,285,814, issued Aug. 25, 1981,
4,419,240, issued Dec. 6, 1983,
4,460,468, issued Jul. 17, 1984,
4,490,253, issued Dec. 25, 1984,
4,669,167, issued Jun. 2, 1987,
4,842,739, issued Jun. 27, 1989,
4,877,526, issued Oct. 31, 1989,
5,039,410, issued Aug. 13, 1991,
5,045,194, issued Sep. 3, 1991, and
5,075,004, issued Dec. 24, 1991.

The most pertinent reference is the 4,877,526 patent.

The prior art filter apparatus includes a housing, a cover plate, a basket, and a filter bag subassembly. The prior art filter bag subassembly has a single bag unit composed of filter material such as paper or cloth and has a snap ring or steel ring. The prior art filter bag unit is conventionally a three-layer bag unit, which has a first inner layer, a second middle layer, and a third outer layer. This bag unit is made by stitching the layers together, then using a final layer which is made longer in the collar, folding it over the snap ring or steel ring and sewing the collar around the ring.

One of the major problems with the prior art filter apparatus is that the filter bag unit is relatively bulky. Another problem with the prior art apparatus is that the filter bag unit does not provide an adequate bypass seal. A further problem with the prior art filter apparatus is that the filter bag unit is relatively difficult to handle and to install.

OBJECTS OF THE INVENTION

One of the objects of the present invention is to provide a filter apparatus wherein the filter bag unit is not bulky. Another object of the invention is to provide a filter apparatus wherein the filter bag unit provides an adequate bypass seal. A further object of the invention is to provide a filter apparatus wherein the filter bag unit is relatively easy to handle and to install.

The foregoing and other objects, features and the advantages of the invention will be apparent from the following detailed description.

SUMMARY OF THE INVENTION

According to the present invention, a filter apparatus is provided. The filter apparatus comprises an enclosure subassembly having a housing and a cover plate, a basket subassembly having a basket portion and an annular member with a seal portion, and a filter bag subassembly. The filter bag subassembly has a multitude of bags and a resilient or thermoplastic collar. The collar has a stepped shape and has radially-spaced and axially-spaced concentric cylinder portions to which are respectively affixed to the bags at the top portions thereof. The outer bag has a single layer and the other bags have one or more layers each.

By using radially-spaced and axially-spaced bags, such as five, the problem of a bulky filter bag arrangement is avoided.

By using one or more layers per bag and by welding or otherwise affixing, such as by stitching, each of the layers to a separate collar cylinder portion, bypass is avoided.

DESCRIPTION OF THE DRAWINGS

FIG. 3 is a plan section view as taken along the line 3—3 of FIG. 1;

FIG. 4 is a section view as taken along the line 4—4 of FIG. 3;

DESCRIPTION OF THE PREFERRED EMBODIMENT

Figure 1:
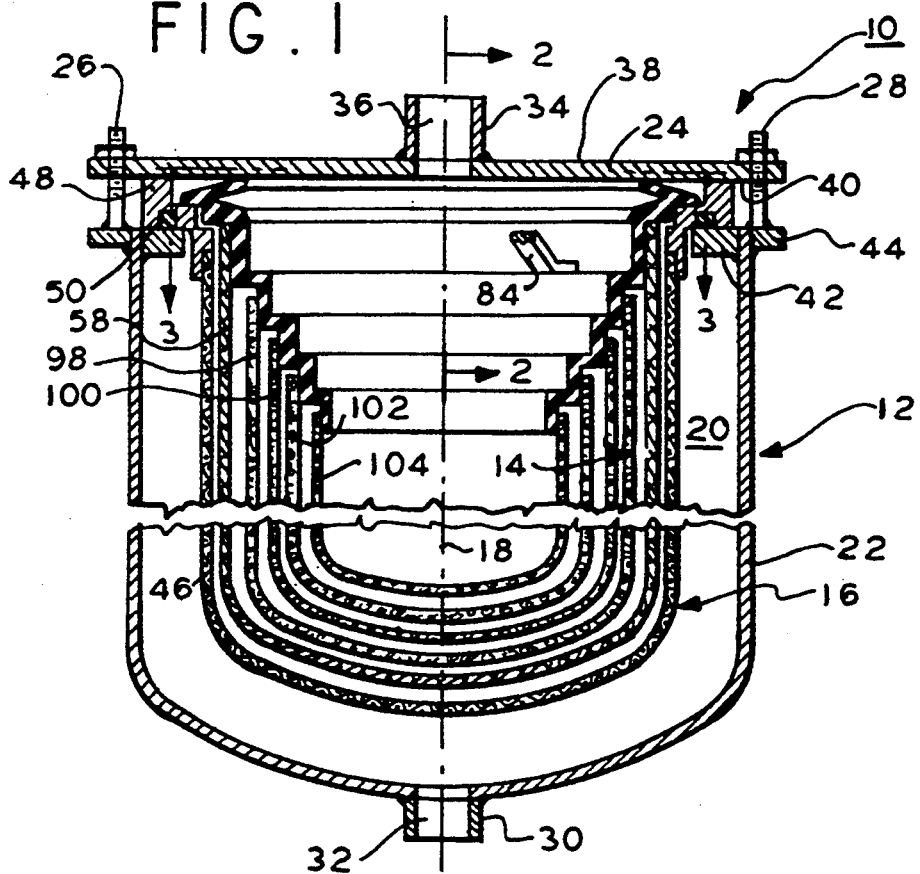
FIG. 1 is a vertical section view of a filter apparatus according to the invention.

As shown in FIG. 1, a pressure filtration apparatus 10 is provided. The apparatus generally indicated at 10 includes an enclosure subassembly 12, a basket subassembly 16, and a filter bag subassembly 14, which are coaxial about an axis 18. Enclosure subassembly 12 is a pressure vessel.

The enclosure subassembly 12, encloses a cavity 20, and has a housing 22 and a cover plate 24, which has a plurality of hold-down bolts 26, 28 with associated nuts or fasteners. Housing 22 also has an outlet pipe 30 with an outlet passage 32 from chamber 20. The cover plate 24 has an upper surface 38 and a lower surface 40 with an inlet pipe 34 with an inlet passage 36 to cavity 20.

The housing 22 also has an inner flange or support bracket 42, which supports basket subassembly 16 and has an outer flange 44, which supports bolts 26, 28.

Figure 2:
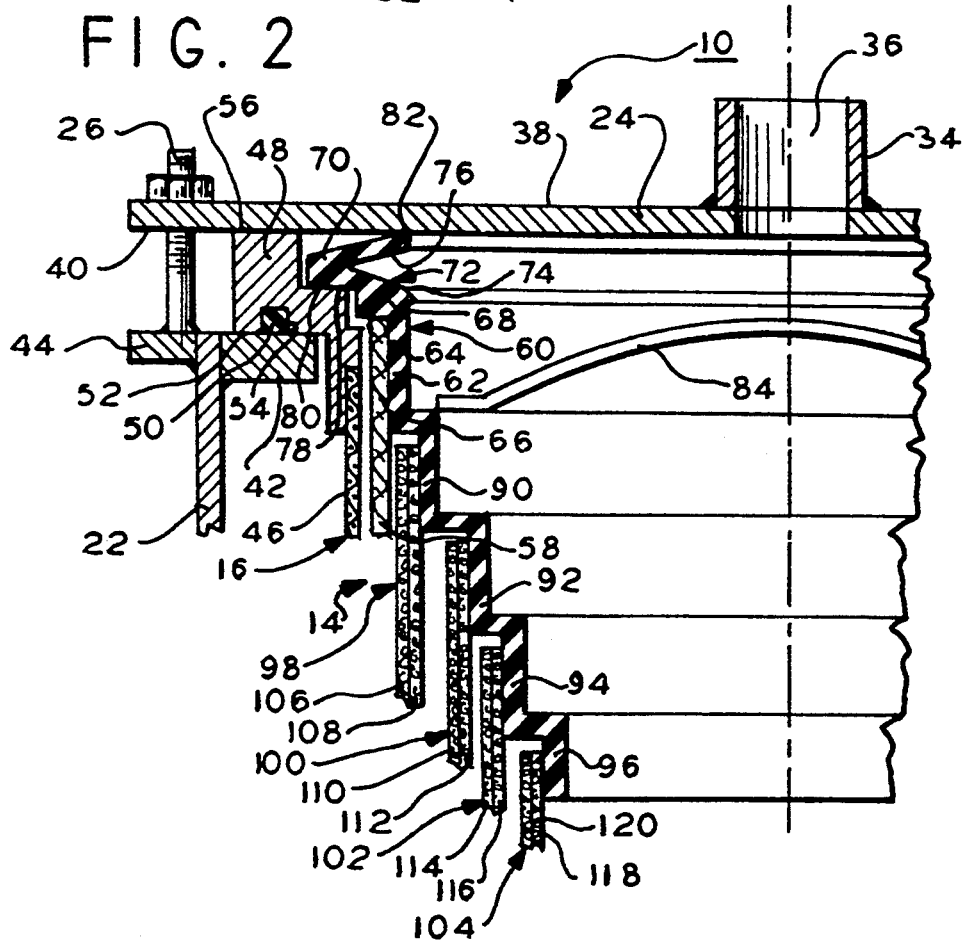
FIG. 2 is a portion of FIG. 1.
Figure 5:
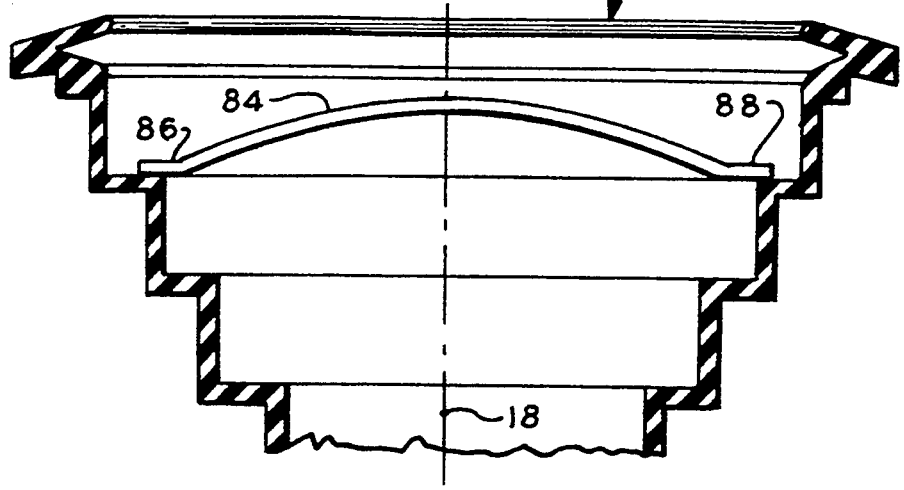
FIG. 5 is a section view as taken along the line 5—5 of FIG. 4.
Figure 6:
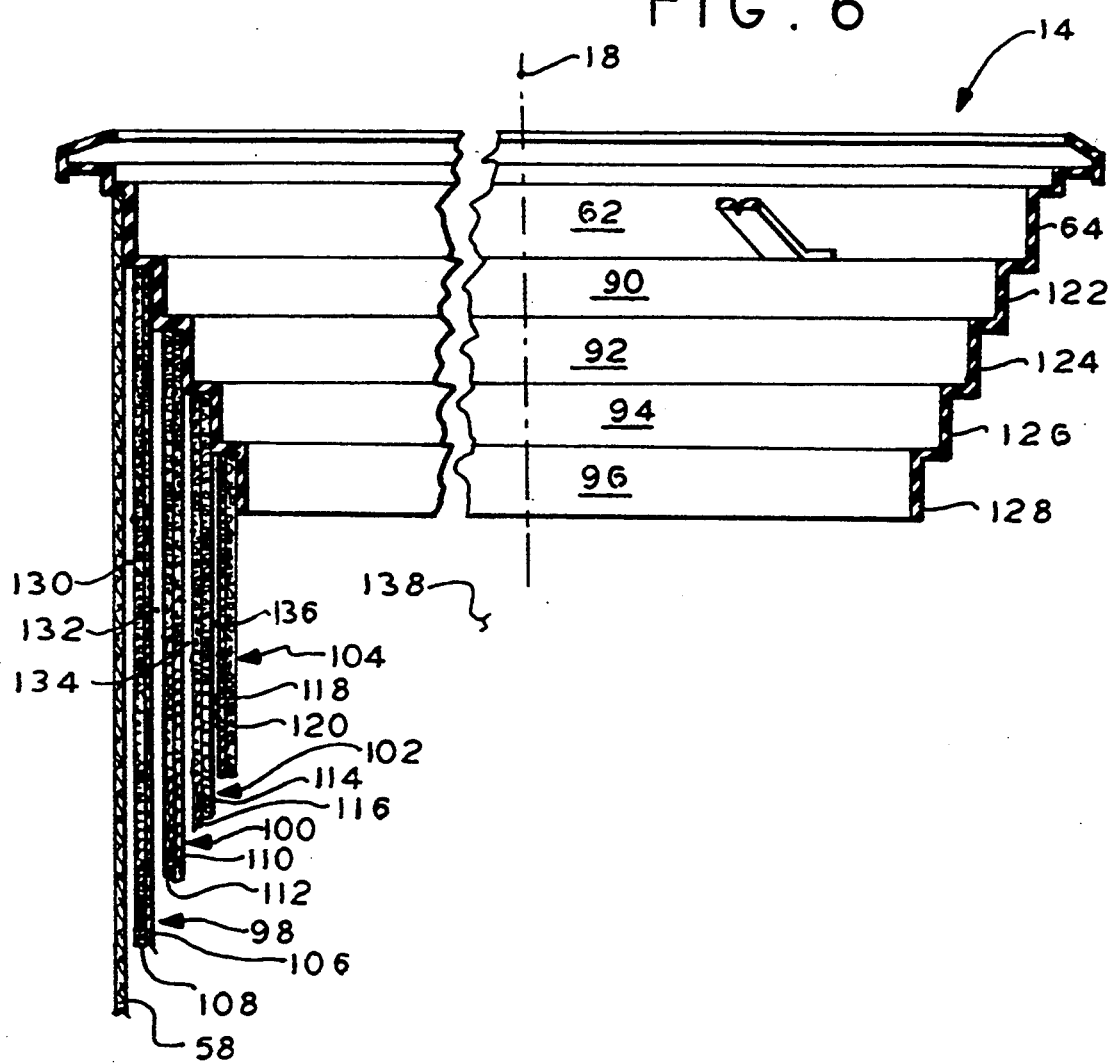
FIG. 6 is an enlarged cutaway view of a portion of FIG. 1.

As shown in FIG. 2, the basket subassembly 16 has a basket portion 46, and has an annular member 48, which has an O-ring 50 of rubber-like material. Annular member 48 has an underside surface 52, which has a groove 54 that receives O-ring 50. Annular member 48 is fixedly connected to and supports basket portion 46. Annular member 48 also has an upper bearing surface 56. Annular member 48 bears an O-ring 50, which bears on inner flange 42.

Filter bag subassembly 14 as shown has five filter bags, including a first, outer filter bag 58, and a seal ring or integral collar 60. Collar 60 has a pyramidal shape and is stepped-down in diameter. Collar 60 is made of a molded rubber or thermoplastic material. Collar 60 has a first cylindrical or cylinder portion 62, which has a ring-shaped one-sided first recess 64 that receives a top end portion 66 of first filter bag 58. Collar 60 also has a middle portion 68 and a top lip portion 70. Bag 58 is attached to first cylinder portion 62 by a continuous weld. Middle portion 68 and top lip portion 70 together form a circumferential slot or inner groove 72. Groove 72 has a slanted lower sidewall 74 and a slanted upper sidewall 76. Top lip portion 70 and middle portion 68 have a pivotal web portion 78 therebetween, for pivoting of portion 70 relative to portion 68. Top lip portion 70 forms a bottom ring-shaped sealing area 80 with portion 48, and forms a top ring-shaped sealing area 82 with cover plate 24, due to internal pressure forces on sidewalls 74, 76.

Collar 60 also has a handle 84 for lifting bag 58 from cavity 20. Handle 84 has flared end portions 86, 88, each of which is integrally molded with collar 60 and is connected to lower portion 62.

Collar 60 is retained between cover plate 24 and annular member 48. Liquid pressure inside bag 58 exerts a force on each of the sidewalls 74 and 76. Such forces flex lip portion 70 and cause the formation of a substantially leak-proof sealing between lip portion 70 and cover plate 24. A lever-type action about the web portion 78 causes a seal area 80 between the underside of lip portion to annular member 48 and causes a seal area 82 between the top of lip portion 70 and cover plate 24. The higher the internal pressure, the higher is the sealing force exerted on cover plate 24 and on annular member 48.

Handle 84 curves upwardly away from its end portions 86, 88. Handle 84 at the center portion, between end portions 86, 88, is relatively close to the top of collar 60, and near to the top of basket member 48.

Collar 60 has a second stepped-down cylindrical portion or cylinder portion 90, a third stepped-down cylinder portion 92, a fourth stepped-down cylinder portion 94, and a fifth, inner, stepped-down cylinder portion 96. Each of the cylinder portions 62, 90, 92, 94, 96 is L-shaped in cross-section.

Cylinder portions 90, 92, 94, 96 support respective filter bags 98, 100, 102, 104. Bags 98, 100, 102, 104, respectively, have a pair of layers 114, 116 and a pair of inner layers 118, 120.

Cylinder portions 90, 92, 94, 96, respectively, have a second recess 122 which receives and supports layers 106, 108; a third recess 124 which receives and supports layers 110, 112; a fourth recess 126 which receives and supports layers 114, 116; and a fifth inner recess 128 which receives and supports layers 118, 120.

Layers 106, 108, 110, 112, 114, 116, 118, 120 each has two respective side edge portions (not shown) which are joined together by a seam weld, and each has a seam-welded bottom edge portion.

First and second and third and fourth and fifth bags 58, 98, 100, 102, 104, respectively, form chambers 130, 132, 134, 136, 138 within cavity 20.

Although the filter bag has been described as having five bags, it is not so limited. Further, the layers can be one or more, although two is preferred. The layers can be stitched together rather than welded.

The advantages of apparatus are indicated hereafter:

A) The filter bag subassembly 14 provides for a relatively high dirt-holding capacity due to its multilayers and due to its depth.

B) High operating efficiency is achieved by filter bag subassembly 14 through a combination of variable pore sizes in the inner layer 96 and intermediate layers 90, 92, 94 and a final fixed pore size in the outer layer 58.

C) Long life, which is directly proportional to high dirt-loading capacity, is achieved because the total volume of fluid which passes through filter bag subassembly 14 is relatively high before filter bag subassembly 14 becomes clogged.

D) This construction of bags 58, 98, 100, 102, 104 allows for all welded seams around the collar 60.

E) Since bags 58, 98, 100, 102, 104 do not have any needle holes from stitching, and since collar 60 is of a pressure-energized design as described in U.S. Pat. No. 5,075,004, bypass of unfiltered fluid is not possible.

F) The layers of the bags 58, 98, 100, 102,104 have a graded density and graded pore size, with a larger opening size used in the inner bag and a smaller opening size used in the outer bags, thereby providing capture of larger particles in the inner filter bags and finer particles in the final outer filter bag.

G) The final outer layer 58 is made preferably of a membrane material, so that each inner layer acts as a pre-filter to protect the membrane from premature clogging, which can give the filter bag a microfiltration capability of up to an absolute filtration of less than 1 micron.

H) The material of construction of the pre-filter layers 106, 108, 110, 112, 114, 116, 118, 120 is a plastic-like material, such as polypropylene, polyester, nylon, viscose, teflon, etc.

I) As an alternate, various layers are electrically-charged or chemically-treated and are incorporated into the filter bag subassembly 14 in order to enhance filtration results.

J) As another alternate, composites or various combinations of materials are incorporated into the filter layers, including needled felt, melt blown, spun bonded, flash spun and wet or dry laid media.

K) As a further alternate, for some filtration applications wherein the pre-filter is required only in order to eliminate a premature clogging of the final filter, the filter bag subassembly 14 has a step-down collar 60 with pre-filter 96, intermediate filter 90 and final filter 58.

L) Installation of filter bag subassembly 14 is simplified because the operator simply places filter bag subassembly 14 in the housing and closes the lid, and after use, the operator removes it and disposes of its contents so that there is no need to clean the housing.

M) By selecting the pore sizes of the various layers of the filter bag subassembly 14, the desired final product is achieved. For a long life for filter bag subassembly 14, selected graded pore layers are used. For high efficiency of operation, graded pore sizes with a final layer of fixed pore size are used. For an absolute rated microfiltration, a membrane as a final layer is used. Materials of construction are selected based on chemical capability and operating temperature. A combination of properties is selected for the final layer.

N) One of the main advantages of filter bag subassembly 14 is the filter capability to self control the dirt-loading capacity and distribute the material throughout the layers of the filter and, in the process, to control the differential pressure across each layer of the filter. As a layer of filtration cake starts to build across the filtration media, the differential pressure across the media starts to increase and the media starts to stretch, since the individual medial layers are rigidly attached to the upper collar and held in position at its upper portion, the increased differential pressure causes the material to stretch. As stretching is taking place, the pore size of the media increases and permits controlled release of the cake material to pass through to the next layer. This process distributes the cake throughout the layers of the bag and equalizes and reduces the differential pressure across the bag, which in return gives the bag a relatively high dirt-holding capacity and a long life due to reduced differential pressure across the entire bag. The outer layer of the bag which determines the final filtration properties is not allowed to stretch since it is supported and restrained by the filter basket 46. This guarantees the final predetermined particle retention properties.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A filter apparatus comprising:
   an enclosure subassembly having an axis and having a housing with an inlet and an outlet for receiving and discharging the material to be filtered, and a top flange and having a cover plate connected to the housing, said inlet being attached to the cover plate;
   a basket subassembly having a basket portion and having an annular ring in sealing engagement with the top flange; and
   a filter bag subassembly having a plurality of filter bag units and an integral collar;
   said filter bag units including a first outer bag unit of selective material, intermediate bag units of selective material disposed next to and radially inwardly of the first outer bag unit and having an inner bag unit disposed next to and radially inwardly of the intermediate bag unit; and
   said collar having a plurality of radially-spaced and axially-spaced recesses receiving the bag units at top portions thereof.

2. The apparatus of claim 1 wherein the intermediate bag units have a pair of layers; and each said pair of layers is joined together and to the integral collar by a seam weld.

3. The apparatus of claim 1, wherein the intermediate bag units form respective chambers through which fluid passes for removal of contaminants.

4. The apparatus of claim 1, wherein said recesses are formed in respective cylinder portions of the collar, said cylinder portions being concentric about the axis and being radially-spaced and being axially-spaced.

5. The apparatus of claim 1, wherein the intermediate bag units have two layers of selective material and the first bag has a single layer of selective material.

6. The apparatus of claim 1, wherein the intermediate bag units are a mesh, and said mesh is a continuous, extruded, plastic, formed sheet, and said layers each have a selective pore size.

7. A filter apparatus comprising:
   an enclosure subassembly having an axis and having a housing with an inlet and an outlet for receiving and discharging the material to be filtered, and a top flange and having a cover plate connected to the housing, said inlet being attached to the cover plate;
   a basket subassembly having a basket portion and having an annular ring in sealing engagement with the top flange; and
   a filter bag subassembly, including a collar in sealing engagement with the annular ring and with the cover plate;
   said collar having at least one elongated handle and a radial inner face;
   said handle having opposite end portions, each end portion having an arcuate flexible connection to the radial inner face;
   whereby an axial lifting force on the handle is disposed parallel to and slightly offset from a filter bag subassembly tension force for minimizing twisting of the collar; and
   said collar having a first cylinder portion fixedly connected to a first bag and having a middle portion supported by the annular ring and having a top lip portion engaging the cover plate;
   said collar having an inner surface with an inner groove having a lower sidewall disposed adjacent to the middle portion and having an upper sidewall disposed adjacent to the top lip portion;
   said collar having a pivotable web portion disposed between the middle portion and the top lip portion;
   whereby forces normal to the groove sidewalls due to internal pressure within the filter bag subassembly pivots the top lip portion about the pivotable web portion causing a sealing ring area of the lip portion on the cover plate and causing a sealing ring area of the lip portion on the annular member;
   said collar having second and third and fourth and fifth cylinder portions;
   said first and second and third and fourth and fifth cylinder portions being radially-spaced apart and axially-spaced apart;
   said filter bag subassembly having second and third and fourth and fifth bags fixedly connected to the respective second and third and fourth and fifth cylinder portions,
   whereby bulkiness is minimized and fluid bypass is avoided and operating efficiency is improved.

8. The apparatus of claim 7, wherein the second and third and fourth and fifth bags each have two layers of selective material and the first bag has a single layer of selective material.

9. The apparatus of claim 8, wherein the second and third and fourth and fifth bag layers each is a mesh, and said mesh is a continuous, extruded, plastic, formed sheet, and said layers each have a selective pore size.

10. A filter apparatus comprising:
    an enclosure assembly having an axis and a housing with an inlet and an outlet for receiving and discharging the material to be filtered, and a top flange and having a cover plate connected to the housing, said inlet being attached to the cover plate;
    a basket subassembly having a basket portion and having an annular seal ring in sealing engagement with the top flange;
    a filter bag subassembly having a collar with axially-spaced recess portions, and including:
    a radially outer bag made from a membrane sheet;
    at least one intermediate pre-filter bag made from two layers of selective mesh; and
    a radially inner pre-filter bag made from two layers of selective mesh; wherein
    said bags having respective axially-spaced top portions respectively welded to said axially-spaced recess portions.

* * * * *